United States Patent [19]

Kunz et al.

[11] 4,206,270
[45] Jun. 3, 1980

[54] CATHODES FOR MOLTEN CARBONATE FUEL CELLS

[75] Inventors: H. Russell Kunz, Vernon, Conn.; Lawrence J. Bregoli, Southwick, Mass.; Francis J. Luczak, Glastonbury, Conn.

[73] Assignee: United Technologies Corporation, Hartford, Conn.

[21] Appl. No.: 969,596

[22] Filed: Dec. 14, 1978

[51] Int. Cl.² .................................. H01M 8/14
[52] U.S. Cl. ......................... 429/40; 429/46
[58] Field of Search ............... 429/16, 29, 33, 46, 429/40, 218, 223, 44

[56] References Cited

U.S. PATENT DOCUMENTS

| | | | |
|---|---|---|---|
| 3,268,365 | 8/1966 | McQuade et al. | 429/16 |
| 3,400,054 | 9/1968 | Ruka et al. | 204/130 X |
| 3,644,147 | 2/1972 | Young | 429/40 |
| 3,959,018 | 5/1976 | Dunlop et al. | 429/40 |

Primary Examiner—Anthony Skapars
Attorney, Agent, or Firm—Stephen E. Revis

[57] ABSTRACT

Porous cathodes for molten carbonate type fuel cells are made from perovskites. The perovskites tested to date all appear to be good cathode catalysts for the reduction of oxygen in molten carbonate electrolyte and are also stable in the electrolyte.

6 Claims, 1 Drawing Figure

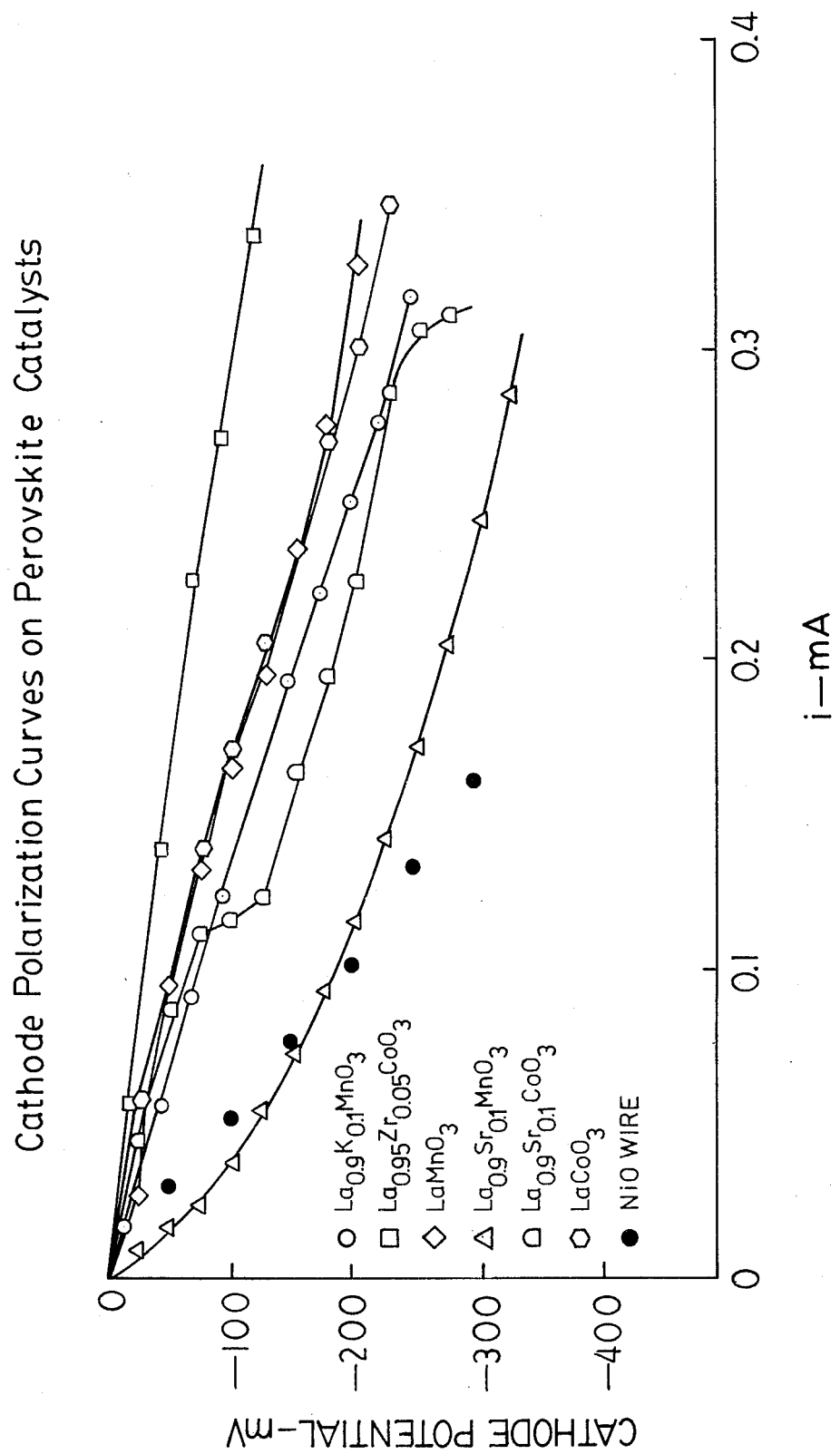

CATHODES FOR MOLTEN CARBONATE FUEL CELLS

BACKGROUND OF THE INVENTION

1. Field of the Invention

This invention relates to molten carbonate fuel cells and more particularly to cathode electrodes for molten carbonate fuel cells.

2. Description of the Prior Art

Fuel cells which use alkali-metal carbonates as the electrolyte are well known in the art and are generally referred to as molten carbonate fuel cells since the electrolyte is liquid at typical operating temperatures in the range of 550° C. to 750° C. The electrolyte is usually mixed with an inert particulate material which remains solid during cell operation to maintain spacing between the electrodes. The combination of electrolyte and inert is referred to as a tile at room temperature. Most molten carbonate fuel cell electrolytes are ternary or binary mixtures of, for example, lithium carbonate, potassium carbonate, and sodium carbonate. Molten carbonate electrolytes are discussed in greater detail in U.S. Pat. Nos. 3,998,939 and 4,079,171. Molten carbonate fuel cell systems in general are described in commonly owned U.S. Pat. Nos. 3,615,839 Thompson et al; 4,041,210 Van Dine; and 4,080,487 Reiser.

Anode electrodes for these cells may be, for example, nickel or cobalt. Prior art cathode electrodes for these cells are made of silver or nickel. The nickel oxidizes during cell operation, and it is the nickel oxide which provides the catalytic activity of the cathode. The cathode reaction is shown by the following equation:

$$\tfrac{1}{2}O_2 + CO_2 + 2e^- \rightarrow CO_3^= \qquad (1)$$

The anode reaction is shown by the following equation:

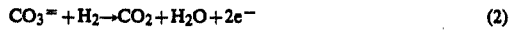
$$CO_3^= + H_2 \rightarrow CO_2 + H_2O + 2e^- \qquad (2)$$

One function of the material from which the cathode is made is to catalyze the reduction of oxygen so as to accelerate the reaction of equation (1) to the right. Other desired properties of the cathode are high porosity, electronic conductivity, structural integrity, corrosion resistance, and stability in terms of its performance level. Silver is an excellent catalyst for the reduction of oxygen and initially performs very well; however, it has poor corrosion resistance and dissolves in the electrolyte. The dissolved material migrates toward the anode causing performance to deteriorate relatively quickly with time. Nickel oxide does not provide as good an initial performance as silver but it is significantly more corrosion resistant to the molten carbonate electrolytes. In manufacturing the electrode, nickel powder is initially formed into a porous plaque. Upon use in the fuel cell the nickel reacts with the electrolyte and the oxidant and oxidizes to nickel oxide. As it oxidizes the plaque tends to lose its structural integrity. Since the nickel oxide structure cannot be controlled, electrodes cannot be manufactured which will have optimum structural characteristics during cell operation.

It has been discussed by R. J. H. Voorhoeve in Chapter 5 of "Advanced Materials in Catalysis" edited by J. J. Burton and R. L. Garten, Academic Press, NY (1977), that lanthanum, strontium, cobalt, nickel and some other perovskites have properties making them suitable for use as cathode catalysts in both low temperature aqueous electrolyte cells and high temperature solid electrolyte cells. Examples of low temperature aqueous electrolytes are acids, such as phosphoric acid, and bases, such as potassium hydroxide. Solid oxide electrolytes are, for example, calcia doped zirconia or gadolinia doped ceria. Solid oxide cells are typically operated in the 1000° C. range in order to get adequate ionic conductivity of the electrolyte. Solid oxide cells are discussed in U.S. Pat. No. 3,533,849 Mitoff. In that patent perovskites such as $La_{0.6}Sr_{0.4}FeO_3$, $LaCoO_3$, $Co_{0.8}Sr_{0.2}LaO_2$ and others were tested as cathodes. All of them either performed poorly, had a short life, or degraded rapidly as discussed in column 2 and in Table I thereof. Solid electrolyte cells are also discussed in British Pat. No. 1,070,937 published June 7, 1967. In that patent lanthanum aluminate electrolyte is doped with the perovskite $LaMnO_3$. The cell operates at about 400° C. The $LaMnO_3$ is supposed to make the surface of the electrolyte act like an electrode and thus eliminate the need for the electrode.

It is important to keep in mind that molten carbonate electrolytes provide a completely different type of chemical, thermal and corrosive environment than any of the foregoing types of cells. More specifically, the reactions being catalyzed are totally different.

SUMMARY OF THE INVENTION

One object of the present invention is an improved molten carbonate fuel cell.

A more particular object of the present invention is a high performance cathode for a molten carbonate fuel cell.

A further object of the present invention is a stable cathode for a molten carbonate fuel cell.

According to the present invention a porous cathode for an alkali metal carbonate type fuel cell is made from a perovskite material.

We have found perovskites to be good cathode catalysts for the reduction of oxygen in a molten carbonate electrolyte. Testing to date also indicates they are quite stable in the molten carbonate electrolyte. One advantage of perovskites is that they are already oxides and, therefore, do not oxidize during use. Thus, it is easier to control the structural characteristics which they will have during operation, particularly as compared to using nickel to form the cathode.

A preferred group of perovskite cathode materials is $LaMnO_3$, $LaCoO_3$, $La_xK_yMnO_3$, $La_xZr_yCoO_3$, $La_xSr_yMnO_3$, and $La_xSr_yCoO_3$, where $x+y=1$. Although it is preferred that the perovskite selected for use have low electrical resistivity, this property is not critical since the perovskite may be supported on an electrically conductive material, such as a screen made from stainless steel.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a graph of cathode polarization curves for perovskite catalysts, with the polarization curve for prior art nickel oxide catalyst also being shown for comparative purposes.

DESCRIPTION OF THE PREFERRED EMBODIMENTS

Six perovskite materials, listed in the following table, in solid (i.e., non-porous) form were tested in half-cells and found to be active for oxygen reduction.

TABLE
SAMPLES TESTED

| Perovskite | Resistivity @/200° F. ($\Omega$-cm) |
|---|---|
| $La_{0.95}Zr_{0.05}CoO_3$ | <1.0 |
| $LaCoO_3$ | $3 \times 10^{-3}$ |
| $LaMnO_3$ | $3 \times 10^{-2}$ |
| $La_{0.9}K_{0.1}MnO_3$ | $7 \times 10^{-2}$ |
| $La_{0.9}Sr_{0.1}CoO_3$ | $2 \times 10^{-3}$ |
| $La_{0.9}Sr_{0.1}MnO_3$ | $3 \times 10^{-2}$ |

The samples tested were in the form of small bars approximately 1.5×3.0×30.0 mm. In each test a gold wire was affixed to one end of the test sample. The other end of the bar just touched an electrolyte melt, allowing a natural meniscus to form. In these tests the electrolyte was a lithium-potassium binary eutectic with a Li to K mole ratio of 1.63. The experiment was performed at a temperature of 1200° F. (649° C.). The oxidant mixture used was an $O_2/CO_2$ mixture with a 1:2 mole ratio. Potentiostatic performance curves were taken by changing the electrode potential in a stepwise manner and recording the current as a function of potential. The curves are shown in the drawing. Also plotted, for comparison purposes, is the potentiostatic performance curve for an oxidized solid nickel wire which is representative of prior art cathodes. The relationship between performance of the perovskites and that of nickel oxide can only be approximated due to differences in shape and surface morphology of the samples tested.

After the tests, the samples were carefully examined microscopically along their sharp edges for indications of corrosion. No indications of corrosion were found on any of the samples thus verifying the short term stability for each of the materials. It is expected that all of these materials will also have better long term stability than either nickel or silver.

It is preferred that the electrical resistivity of the perovskite selected be less than about 1.0$\Omega$-cm if the cathode is to be made entirely from the perovskite. The table above gives the resistivity of the perovskites we tested. Perovskites with resistivities from 1.0-10.0$\Omega$-cm may also be used; however, they would have to be supported on an electrically conductive grid made from, for example, stainless steel, or would have to be mixed with an electrically conductive particulate material.

A porous fuel cell cathode in accordance with the present invention may be made by pressing and sintering a powder of the perovskite catalyst. The preferred pressing and sintering conditions will vary with the perovskite selected and the desired porosity and pore size characteristics.

EXAMPLE

This example is a method which may be used to manufacture a lanthanum cobaltate ($LaCoO_3$) perovskite fuel cell cathode having a porosity of between 50 and 60% and an average mean pore size between four and ten microns. To make lanthanum cobaltate, cobalt oxide powder and lanthanum oxide powder are mixed together in proportions calculated to give the desired perovskite crystal structure. (Cobalt oxide may be made by decomposing cobalt carbonate.) The oxide mixture is packed in a crucible and fired at 1250° C. for six hours. The resulting solid material is broken up into pieces and ball-milled in anhydrous alcohol. It is then fired again at 1250° C. for about six hours. The resulting lanthanum cobaltate is then ball-milled to the desired particle size which will generally be between one and twenty microns. This perovskite powder is placed in a mold and cold pressed at 10,000–15,000 lb/in.$^2$. The pressed perovskite structure is then sintered by firing at 1150° C. for three hours.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A fuel cell including an alkali metal carbonate electrolyte which is molten during operation of the fuel cell, an anode electrode in contact with said electrolyte, and a porous perovskite cathode electrode spaced from said anode electrode and also in contact with said electrolyte, the perovskite having an electrical resistivity of less than 10.0$\Omega$-cm.

2. The fuel cell according to claim 1 wherein said perovskite is selected from the group consisting of $La_xK_yMnO_3$, $La_xZr_yCoO_3$, $La_xSr_yMnO_3$, and $La_xSr_yCoO_3$, where $x+y=1.0$.

3. The fuel cell according to claim 1 wherein said perovskite is selected from the group consisting of $La_{0.9}K_{0.1}MnO_3$, $La_{0.95}Zr_{0.05}CoO_3$, $LaMnO_3$, $La_{0.9}Sr_{0.1}MnO_3$, $La_{0.9}Sr_{0.1}CoO_3$, and $LaCoO_3$.

4. The fuel cell according to claim 1 wherein the perovskite material of which said cathode electrode is made has an electrical resistivity of no more than 1.0$\Omega$-cm.

5. The fuel cell according to claim 1 wherein said electrolyte is a binary eutectic of lithium carbonate and potassium carbonate.

6. A fuel cell including a binary eutectic electrolyte of lithium carbonate and potassium carbonate which is molten during operation of the fuel cell, an anode electrode in contact with said electrolyte, and a porous perovskite cathode electrode spaced from said anode electrode and also in contact with said electrolyte, said perovskite being selected from the group consisting of $LaMnO_3$, $LaCoO_3$, $La_xK_yMnO_3$, $La_xZr_yCoO_3$, $La_xSr_yMnO_3$, and $La_xSr_yCoO_3$, where $x+y=1.0$ and said perovskite has an electrical resistivity of no more than 1.0$\Omega$-cm.

* * * * *

UNITED STATES PATENT AND TRADEMARK OFFICE
CERTIFICATE OF CORRECTION

PATENT NO. : 4,206,270
DATED : June 3, 1980
INVENTOR(S) : H. RUSSELL KUNZ ET AL

It is certified that error appears in the above-identified patent and that said Letters Patent are hereby corrected as shown below:

In the "ABSTRACT", line 4: after "in", insert --a--.

Column 3, in the "TABLE", the line titled "Resistivity @/200°F." should read --Resistivity @ 1200°F.--

Signed and Sealed this

Nineteenth Day of August 1980

[SEAL]

Attest:

SIDNEY A. DIAMOND

Attesting Officer

Commissioner of Patents and Trademarks